(12) United States Patent
Park et al.

(10) Patent No.: US 8,799,779 B2
(45) Date of Patent: Aug. 5, 2014

(54) TEXT INPUT METHOD IN PORTABLE DEVICE AND PORTABLE DEVICE SUPPORTING THE SAME

(75) Inventors: Se Hwan Park, Suwon-si (KR); Sung Wook Park, Deokyang-gu (KR); Hyung Jun Kim, Seongnam-si (KR); Ji Hoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 13/042,696

(22) Filed: Mar. 8, 2011

(65) Prior Publication Data

US 2011/0225529 A1 Sep. 15, 2011

(30) Foreign Application Priority Data

Mar. 12, 2010 (KR) ........................ 10-2010-0022505

(51) Int. Cl.
*G06F 3/00* (2006.01)
*G06F 3/048* (2013.01)
*G06F 9/44* (2006.01)
*G06F 3/0481* (2013.01)

(52) U.S. Cl.
CPC ............ *G06F 9/4448* (2013.01); *G06F 3/0481* (2013.01)
USPC ........... 715/703; 715/773; 715/780; 715/864; 345/168; 345/171

(58) Field of Classification Search
USPC .................. 715/703, 769, 771, 773, 780, 864
See application file for complete search history.

(56) References Cited

U.S. PATENT DOCUMENTS

| | | | |
|---|---|---|---|
| 5,535,119 A * | 7/1996 | Ito et al. | 704/3 |
| 2002/0167545 A1 * | 11/2002 | Kang et al. | 345/780 |
| 2009/0066656 A1 * | 3/2009 | Jung et al. | 345/171 |
| 2009/0135147 A1 * | 5/2009 | Hsu et al. | 345/173 |
| 2009/0195418 A1 * | 8/2009 | Oh | 341/34 |
| 2009/0207053 A1 | 8/2009 | Lee | |
| 2009/0262082 A1 * | 10/2009 | Park et al. | 345/171 |
| 2010/0004029 A1 | 1/2010 | Kim | |
| 2010/0004030 A1 * | 1/2010 | Nam | 455/566 |
| 2010/0125811 A1 * | 5/2010 | Moore et al. | 715/846 |
| 2010/0245276 A1 * | 9/2010 | Sim | 345/173 |
| 2010/0259484 A1 * | 10/2010 | Jo | 345/171 |
| 2010/0333011 A1 * | 12/2010 | Kornev et al. | 715/773 |
| 2011/0012716 A1 * | 1/2011 | Miller, IV | 340/407.2 |
| 2011/0109558 A1 * | 5/2011 | Park | 345/171 |

FOREIGN PATENT DOCUMENTS

| | | | |
|---|---|---|---|
| KR | 10-2005-0102829 A | 10/2005 | |
| KR | 10-2008-0015578 A | 2/2008 | |
| KR | 10-2010-0004017 A | 2/2010 | |
| KR | 10-2010-0024471 A | 3/2010 | |

* cited by examiner

*Primary Examiner* — Tadeese Hailu
(74) *Attorney, Agent, or Firm* — Jefferson IP Law, LLP

(57) ABSTRACT

A text input method in a portable device and a portable device supporting the same are provided. The portable device includes, a touch screen including a display unit for displaying a text input area and a text display area including at least one consonant and vowel, and a touch panel provided at an upper side of the display unit for generating a touch event, and a control unit for controlling text displayed according to a touch event generated from the touch screen, in which the control unit detects multi-touch events for at least two key icons output on the text input area, and controls the display of a specific text composed of a combination of the multi-touched key icons based on the detected multi-touch events.

20 Claims, 11 Drawing Sheets

TEXT INPUT METHOD IN PORTABLE DEVICE AND PORTABLE DEVICE SUPPORTING THE SAME

PRIORITY

This application claims the benefit under 35 U.S.C. §119(a) of a Korean patent application filed on Mar. 12, 2010 in the Korean Intellectual Property Office and assigned Serial No. 10-2010-0022505, the entire disclosure of which is hereby incorporated by reference.

BACKGROUND OF THE INVENTION

1. Field of the Invention

The present invention relates to a portable device. More particularly, the present invention relates to a text input method in a portable device that allows a user to rapidly and conveniently perform text input and a portable device supporting the same.

2. Description of the Related Art

In recent years, a portable device having mobility for providing various functions has widely been supplied. A Personal Digital Assistant (PDA) is a representative example of the portable device. The PDA has a Central Processing Unit (CPU), a memory, an Operating System (OS), various programs and specific devices based on the OS. The PDA may execute information collection, storage, creation, and searching functions based on the foregoing structural elements. The PDA has been developed as a complex device capable of performing voice and data communication by mounting a portable phone module therein.

The portable device may include a touch screen. The touch screen is configured by a display unit and a touch panel provided at an upper part of the display unit. When a user touches an icon on the display unit with a finger or a pointer, the portable device may execute an application linked with a corresponding icon or may output texts linked with the corresponding icon on the display unit. However, since the touch screen is mounted in the portable device, the size thereof is restricted. Accordingly, the sizes of key maps output on the touch screen or numerals of keys thereof are restricted. Such a problem remarkably occurs in a key map including a number of key icons for text input. Therefore, there is a need for various methods capable of increasing the size of the key map, reducing the number of the keys, and rapidly and conveniently inputting texts.

SUMMARY OF THE INVENTION

An aspect of the present invention is to address at least the above-mentioned problems and/or disadvantages and to provide at least the advantages described below. Accordingly, an aspect of the present invention is to provide a text input method of a portable device supporting rapid and convenient input of various texts based on a touch screen that a user may multi-touch, and a portable device supporting the same.

In accordance with an aspect of the present invention, a text input method for a portable device is provided. The device includes displaying a screen including a text input area with at least one consonant and vowel, detecting multi-touch events obtained by multi-touching at least two key icons included in the text input area, and combining key icons selected based on the multi-touch events to display a specific text prior to completion of an input of the specific text.

In accordance with another aspect of the present invention, a portable device is provided. The device includes a touch screen including a display unit for displaying a text input area and a text display area including at least one consonant and vowel, and a touch panel provided at an upper side of the display unit for generating a touch event, and a control unit for controlling text displayed according to a touch event generated from the touch screen, wherein the control unit detects multi-touch events for at least two key icons output on the text input area, and controls the display of a specific text composed of a combination of the multi-touched key icons based on the detected multi-touch events.

In the text input method for a portable device and a portable device supporting the same, various characters may be input more rapidly and conveniently based on multi-touch.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a touch event is an event generated according to a user touching a touch panel. The touch event has coordinates value of a touched point, a form of the touch, for example, a value discriminating a touch-down, a touch cancellation, or a drag.

Figure 1:
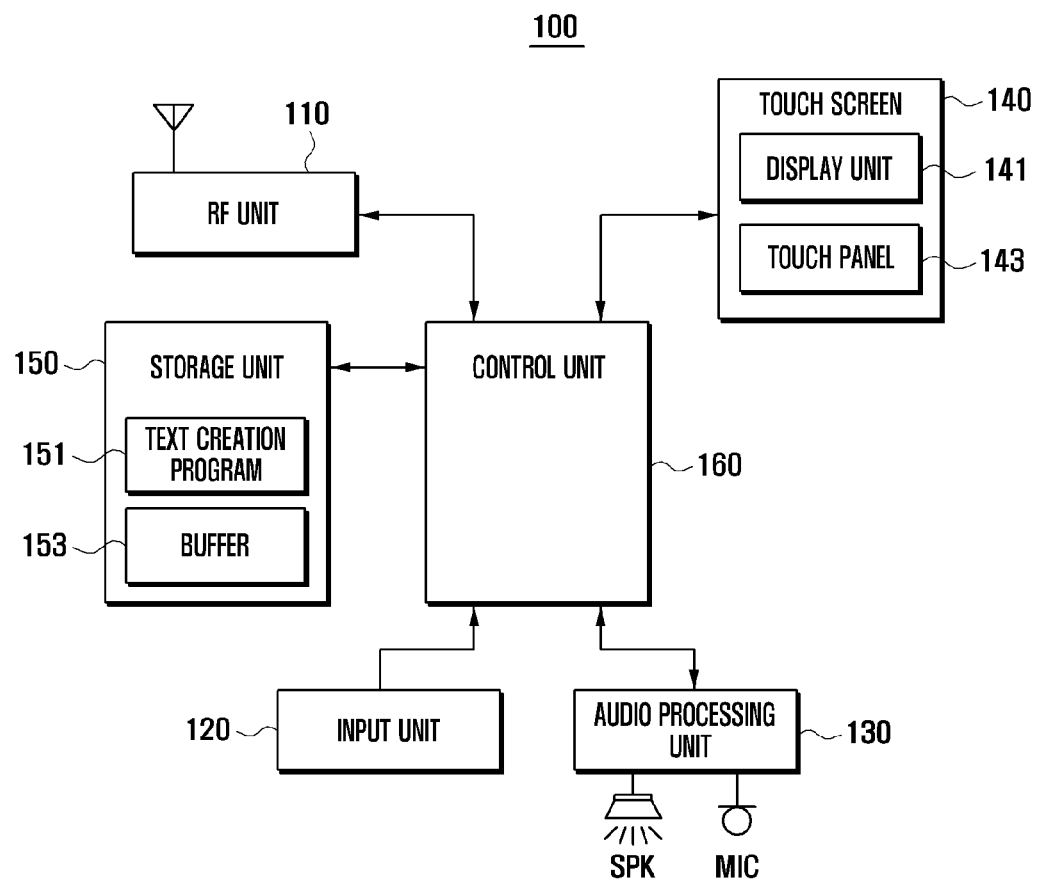
FIG. 1 is a block diagram schematically illustrating a configuration of a portable device according to an exemplary embodiment of the present invention.

FIG. 1 is a block diagram schematically illustrating a configuration of a portable device according to an exemplary embodiment of the present invention.

Referring to FIG. 1, the portable device of an exemplary embodiment of the present invention may include a Radio Frequency (RF) unit 110, an input unit 120, an audio processing unit 130, a touch screen 140, a storage unit 150, and a control unit 160.

The portable device of an exemplary embodiment of the present invention having the construction mentioned above may output a specific key map stored in the storage unit 150 on the touch screen 140. When a user touches at least two points in a multi-touch manner, the portable device 100 may support input of specific texts based on a combination of keys allocated on the touch area. Accordingly, the user may input texts more rapidly and easily. Hereinafter, functions of the respective structural elements will be explained in further detail.

The RF unit 110 forms a first communication channel for voice communication and a second communication channel for data communication under the control of the control unit 160. The data communication may include the communication of images, pictures, or data. That is, the RF unit 110 forms a voice communication channel, a data communication channel, and a picture call channel between mobile communication systems. To do this, the RF unit 110 may include a transmitter up-converting a frequency of a transmitted signal and amplifying the signal, and a receiver low-noise-amplifying a received signal and down-converting the signal. To operate the RF unit 110, the portable device 110 may control the display unit 141 to output various information, for example, phone book information. When the portable device 110 supports a mobile communication function, a construction of the RF unit 110 may be included in the portable device 100. The RF unit 110 may be omitted when the portable device 100 does not support a mobile communication function.

In the meantime, the user may select user information of another portable device stored in a phone book or input numerals corresponding thereto to operate the RF unit 110. In particular, the portable device 100 supported by a full touch screen without separate key buttons or key pads may output key maps including texts on the touch screen 140 to operate the RF unit 110. Here, the key map may include one or more of a Hanguel text key map, a 3*4 key map, a 4*3 key map, a QUERTY key map, etc. The user may create texts using the key map, and transmit the created texts to another portable device using the RF unit 110. The input unit 120 includes plural input keys and function keys for receiving the input of numerals or text information and for setting all types of functions. The function keys may include arrow keys, side keys, and hot keys set to execute specific functions. When the portable device 100 uses a full touch screen, the input unit 120 may include side keys provided at one side of a case without using separate key buttons or key pads. In the meantime, a construction supporting functions of the input unit 120 may be implemented by setting a key map with plural key icons output on the display unit 140 and the touch panel 143 according to a key map when the portable device 100 adopts the touch screen 140. The key map may include one or more of a Hanguel text key map, a QUERTY key map, a 3*4 key map, a 4*3 key map, a menu map, a soft key map, etc. In particular, the input unit 120 of an exemplary embodiment of the present invention may include at least one key capable of selecting a specific mode of the key map, for example, a text input mode selection key. The specific mode is a text input mode supported such that specific texts included in the key map may be used in various manners according to mode section. For convenience in explanation, exemplary embodiments of the present invention may be described in the context of the key map being a Hanguel text key map. However, the present invention is not limited thereto as any of one or more types of key maps may be implemented. Hereafter, the Hanguel input mode will be explained further below using a view of a screen.

The audio processing unit 130 includes a speaker (SPK) outputting audio data transmitted/received at the time of call, audio data included in a received message, and audio data according to the playing of audio files stored in the storage unit 150; and a microphone (MIC) collecting a user's voices or other audio signals at the time of call. When the key maps are switched, the audio processing unit 130 may alarm it. When specific texts are selected from the switched key maps by touch, the audio processing unit 130 may output a specific sound indicating the selection. Further, when text input is performed by multi-touch on the Hanguel text key map according to an exemplary embodiment of the present invention, the audio processing unit 130 may output a specific sound to distinguish from that according to selection of general texts. The specific sound and alarm of the audio processing unit 130 may be omitted according to user selection.

The touch screen 140 includes a display unit 141 and a touch panel 143. The touch screen 140 may have a construction in which a touch panel 143 is disposed at an entire surface of the display unit 141. The size of the touch screen 140 may be determined depending on the size of the touch panel 143. For example, the touch screen 140 may be provided in a full screen form configured to cover the entire surface of the display unit 141.

The display unit 141 displays all types of menus of the portable device 100, information input by a user, or information provided to the user. Namely, the display unit 141 may provide various screens such as an idle screen, a menu screen, a message creation screen, and a call screen according to a use of the portable device 100. The display unit 141 can be configured by a flat panel display such as a Liquid Crystal Display (LCD) or an Organic Light Emitted Diode (OLED). As mentioned above, when the display unit 141 is manufactured in a touch screen 140 form together with the touch panel 143 disposed at an upper part, it may execute functions of the input unit 120. In particular, the display unit 141 of an exemplary embodiment of the present invention may output a Hanguel text key map. The Hanguel text key map may include 14 Hanguel consonants composed of "ㄱ, ㄴ, ㄷ, ㄹ, ㅁ, ㅂ, ㅅ, ㅇ, ㅈ, ㅊ, ㅋ, ㅌ, ㅍ, ㅎ", 3 vowels composed of 천지인 "ㅡ, ㅣ, ' ", a text "쌍" designating other double consonants, a text " ⎵ " for spacing words, an English key map conversion selection text "A", a numeral key map conversion selection text "123", a back text "←", and an input text "ㅓ".

Further, the display unit 141 of an exemplary embodiment of the present invention may output a text input mode selection key to use three vowels included in the Hanguel text key map as a specific function. That is, a user may select which mode the three vowels are used using the text input mode selection key. The text input mode selection key may be allocated to a specific side key as in the input unit 120 or output in a specific icon form on the display unit 141.

The touch panel 143 is provided at an upper part of the display unit 141. When the user touches a predefined area to instruct that specific images or specific items be output on the display unit 141, the touch panel 143 generates a touch event corresponding thereto. When a user sets valid touch areas of respective keys of Hanguel text key map output on the display unit 141 and a touch event occurs on a corresponding valid touch area, the touch panel 143 may transfer it to the control unit 160. For example, the touch panel 143 may generate a touch-down event for selecting a specific key, a drag event moving in a specific direction in a touch-down state, a touch cancellation event occurring upon cancelling the touch-down state, and transfer them to a buffer 153 managed by the control unit 160. Here, a touch sensor can be provided in units of cells of a predefined area, for example, the display unit 141 in the touch panel 143 such that a user may perform multi-touch. Accordingly, the touch panel 143 may recognize various multi-touches executed by the user on a touch panel 143 and transfer the recognized touch events to the buffer 153.

The storage unit 150 may include an application program necessary for a function operation according to an exemplary embodiment of the present invention, and a key map for operating the touch screen 140 when the portable device 100 is configured by the touch screen 140. The key map may include one or more of a key board map, a 3*4 key map, a QUERTY key map, etc. Further, the key map may be a control key map for controlling an operation of a currently activated application program. The key map may be a menu map for controlling an operation of a currently activated application program or a menu map with various menus provided from the portable device 100 as a list. In particular, the key map may include the Hanguel text key map, and a key icon corresponding to a text input mode selection key capable of selecting vowels included in the Hanguel text key map in various input manners. Here, a key icon corresponding to the text input mode selection key may be omitted according to designer's intention. The storage unit 150 may include a program area and a data area. The program area may store an Operating System (OS) for booting of the portable device 100 and for operating the foregoing structural elements, and application programs playing various files. In this case, the application programs include an application program for supporting a call function, a web browser accessing an Internet server, an MP3 application program for playing audio sources, and a moving image play application program. In particular, the program area of an exemplary embodiment of the present invention includes a text creation program 151. The text creation program 151 may support a message creation function, a text creation and edit functions, and a function for inserting texts in specific contents.

The text creation program 151 is program activated when a user selects a menu for creating texts. The text creation program 151 may include a routine supporting output of one among various key maps such as numerals and specific key maps, an English text key map, a Hanguel text key map, etc., according to an input signal; an icon output routine supporting execution of a specific function based on specific texts included in the Hanguel text key map; a routine buffering a touch event occurring on a key map; and a routine controlling input and output of specific texts on the display unit 141 based on touch events buffered according to a touch or multi-touch. Here, the text creation program 151 may further include a text key map designed based on languages of various countries.

The icon output routine may support switching of a text input mode selection scheme according to a toggle scheme or output various icons capable of supporting selection of respective text input modes. Operations of respective input modes will be explained with reference to example views of a screen to be described below in further detail.

The data area is an area in which data created during the use of the portable device 100 is stored. The data area may store phone book information, at least one icon according to a widget function, and various contents. When the display unit 141 is manufactured to be included in the touch screen 140, the data area may store user input achieved through the touch screen 140. In particular, the data area of an exemplary embodiment of the present invention may store the foregoing various key maps, and output corresponding key maps on the display unit 141 under the control the control unit 160. Meanwhile, a part of the data area can be provided as a buffer 153 area controlled by the control unit 160. Here, the buffer 153 may be located at a predefined area of a memory physically implementing the storage unit 150 or in the control unit 160.

The control unit 160 controls the supply of power to respective constructions of the portable device 100 such that they may perform initialization. When the initialization is terminated, the control unit 160 may support Hanguel text key map based text input according to an exemplary embodiment of the present invention for the respective constructions. In more detail, when a menu for creating texts is selected, the control unit 160 loads a text creation program 151 stored in the storage unit 150 and controls the touch screen 140 to output an environment for creating the texts. That is, the control unit 160 may control the display unit 141 to output a text creation screen with a text input area and a text display area. The control unit 160 may set the touch panel 143 located at an area corresponding to the text input area to conform to a specific key map. Accordingly, the user may create a touch event for text input using a specific key map output on the text input area, for example, a Hanguel text key map.

Here, when a touch event occurs on the touch panel 143, the control unit 160 may store the touch event in the buffer 153. The control unit 160 may check touch events stored in the buffer 153 after input of a touch cancellation event to control execution of text input. In a case where a user simultaneously touches one of 14 consonants and one of 3 vowels, when a touch event corresponding to the texts is stored in the buffer 153 and a touch cancellation event occurs, the control unit 160 may control output of a text created by a combination of two simultaneously touched texts on a text display area. That is, the control unit 160 checks touch events stored in the buffer 153. When a touch event selecting plural key icons included in a key map is stored in the buffer 153, the control unit 160 may combine texts corresponding to a key icon according to set information to create a specific text.

In the meantime, the control unit 160 may support a combination of texts differently according to an order of touch events stored in the buffer 153 after selection by a multi-touch selecting specific texts. For example, when texts "•" and " ] " are selected after selection of a text "ㅈ", , a text "져" may be input. Further, when texts "ㅈ", and "]" are selected after selection of a text "•", a text "쪄" may be input. Namely, the control unit 160 may support input of another text according to an occurrence order of the touch events. Moreover, the control unit 160 may support input of the same text regardless of an input order of texts according to a specific mode or specific texts. For example, when a general vowel mode is selected, the control unit 160 may control generation of a specific text according to an order of input texts. In a case where a double consonant generation mode is selected, when a touch event for selecting a specific vowel and a touch event for selecting a consonant are generated, the control unit 160 may combine corresponding touch events to input a double consonant of selected consonants. Furthermore, the control unit 160 may provide a more rapid text completion function for selected texts. For example, a user may select "•" and a text "ㅈ", perform a drag operation in a leftward direction, and perform a touch cancellation operation. Accordingly, the control unit 160 may combine touch events of input texts to input a text "쟈".

As mentioned above, the portable device 100 according to an exemplary embodiment of the present invention may rapidly and conveniently perform various text inputs according to selection of a text input mode.

The forgoing exemplary embodiments have described a construction and functions of the portable device according to the present invention. Hereinafter, a text input method of a portable device according to an exemplary embodiment of the present invention will be described with reference to FIG. 2.

Figure 2:
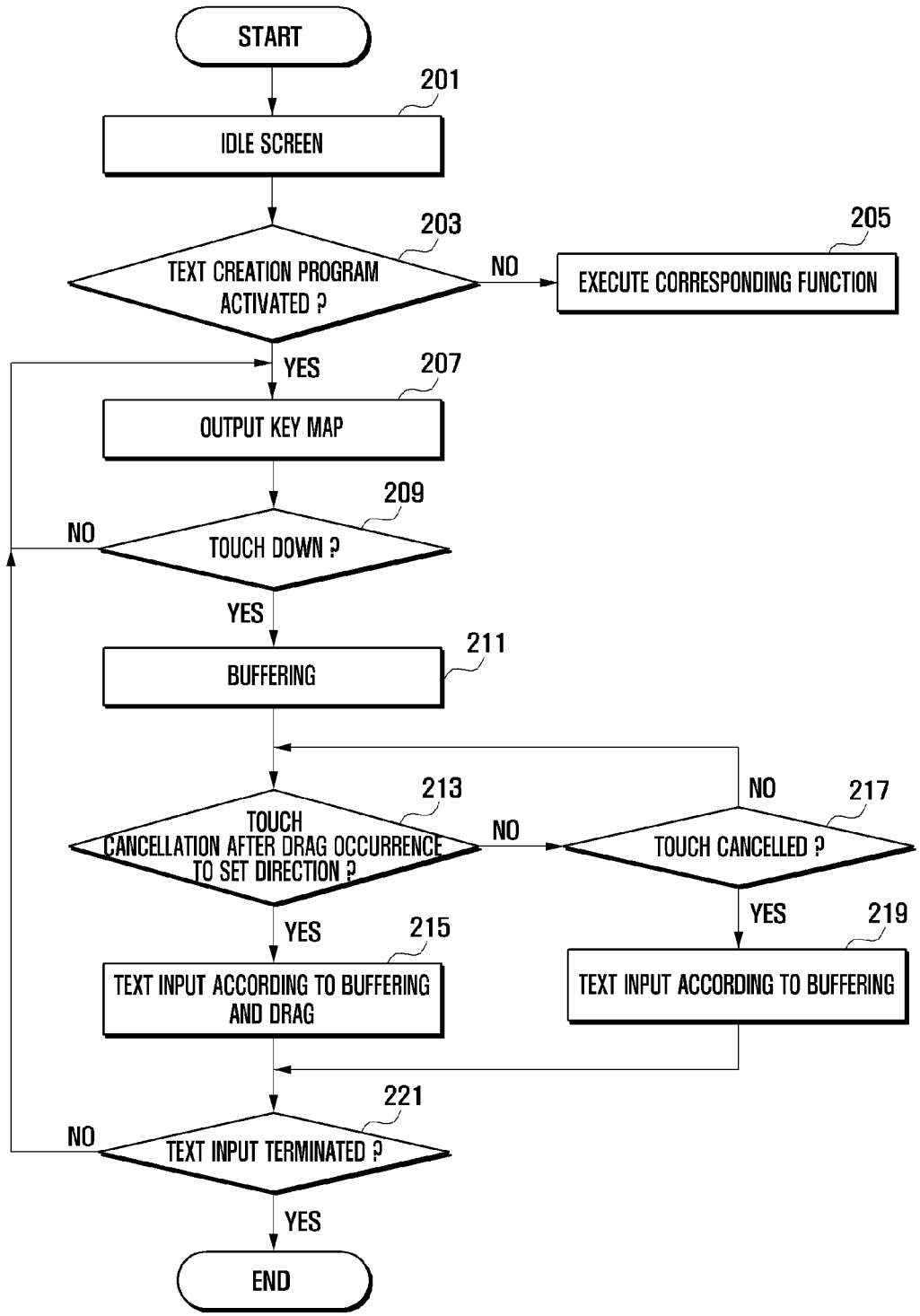
FIG. 2 is a flowchart illustrating a text input method in a portable device according to an exemplary embodiment of the present invention.

FIG. 2 is a flowchart illustrating a text input method in a portable device according to an exemplary embodiment of the present invention.

Referring to FIG. 2, in the text input method of a portable device, a control unit 160 of a portable device 100 performs initialization and booting procedures of respective constructions of the portable device 100 by controlling the supply of power thereto, and controls output of an idle screen according to set schedule information in step 201.

Next, when an input signal occurs according to a user input, the control unit 160 may determine whether a corresponding input signal is an input signal for activating a text creation program 151 in step 203. When the input signal is not the input signal for activating the text creation program 151, the control unit 160 may control execution of a function of a portable device 100 corresponding to the input signal in step 205. For example, the control unit 160 may control execution of various functions such as a communication function, a file play function, and a file searching function, and an Internet access function provided from the portable device 100 according to a corresponding input signal.

Conversely, when the input signal is the input signal for activating the text creation program 151 in step 203, the control unit 160 may control output of a text creation screen, in particular, a key map for creating texts on a display unit 141 in step 207. Here, the control unit 160 may output a specific key map, for example, a Hanguel text key map according to a user setting or setting of a designer designing the portable device 100. Accordingly, the control unit 160 may set a touch panel 143 area corresponding to the Hanguel text key map to a valid touch event creation area.

Subsequently, the control unit 160 may check whether a touch or multi-touch down event occurs on a touch screen 140 on which the Hanguel text key map is output in step 209. When the touch or multi-touch down event does not occur, the control unit 160 returns to step 207. Although not shown in FIG. 2, when an input signal for terminating text creation occurs, the control unit 160 may remove the text creation screen and return to step 201.

Conversely, when the touch or multi-touch down event instructing a specific text occurs, the control unit 160 controls the touch or multi-touch down event to be buffered in a buffer 153 in step 211. Subsequently, the control unit 160 may check whether a touch cancellation event occurs after a drag event in a specific direction occurs based on an occurrence point of a least one touch-down event among multi-touch down events in a state that a multi-touch down maintains in step 213. When the touch cancellation event occurs after a drag occurs in a set direction in step 213, the control unit 160 may control executions of a touch down event buffered in the buffer 153 and text input according to the drag event. When a first Tap operation achieved at a first position on the touch screen 140, and a touch event (i.e., a touch down event and a drag event) occurring at a second position on the touch screen 140 corresponding to a "Tap-Drag" operation according to the generation of a continuous Drag operation after a Tap operation occur, the control unit 160 may control execution of specific text input by a combination of texts selected due to the "Tap and Tap-Drag".

Further, when a touch event corresponding to a first Tap-Drag operation according to the generation of a continuous Drag operation in a first position on the touch screen 140 after a first Tap operation, and a second Tap-Drag operation according to the generation of a continuous Drag operation after a second Tap operation at a second position in a multi-touch state occurs, the control unit 160 may control execution of text input according to a corresponding touch event.

In the meantime, when a drag event according to a drag operation does not occur in step 213, the control unit 160 may check whether a touch cancellation event occurs without a drag event in step 217. When the touch cancellation event occurs without the drag event, the control unit 160 may control text input according to a multi-touch event buffered in the buffer 153 in step 219, namely, "Tap and Tap". Conversely, when the touch cancellation event does not occur in step 217, the control unit 160 may return to step 213.

After step 215 and step 219, the control unit 160 may determine whether an input signal for terminating text input occurs in step 221. When the input signal for terminating the text input does not occur, the control unit 160 may return to step 207 and repeat the following procedures. When the input signal for terminating the text input does occur, the text input is terminated and the procedure according to an exemplary embodiment of the present invention is ended.

As illustrated previously, the text input method of a portable device according to an exemplary embodiment of the present invention may perform specific text input according to touch events, for example, "Tap and Tap", "Tap-Drag and Tap", or "Tap-Drag and Tap-Drag" generated based on a multi-touch.

Further, the text input method of a portable device according to an exemplary embodiment of the present invention previously displays examples of specific texts achieved to be dragged in a specific direction in a multi-touched state prior to termination of text input to easily recognize which texts a user can input. When a user drags in a specific direction and performs touch cancellation, the text input method of an exemplary embodiment of the present invention may support input of text displayed in a corresponding direction.

The specific text input will be explained below in further detail with reference to drawings.

Figure 3:
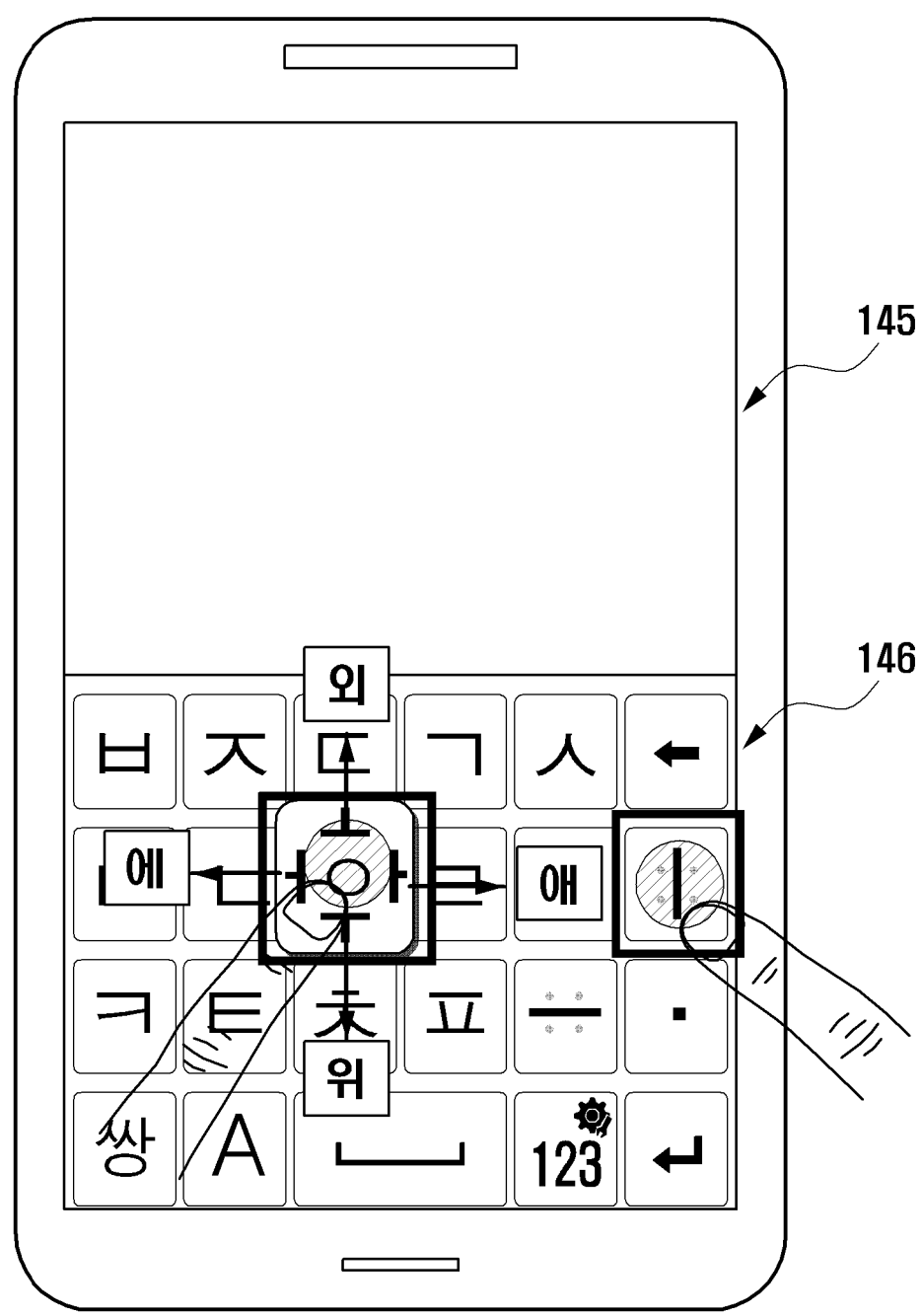
FIG. 3 is a view illustrating an example of a screen describing a text input procedure according to an exemplary embodiment of the present invention.

FIG. 3 is a view illustrating an example of a screen describing a text input procedure according to an exemplary embodiment of the present invention. Prior to the explanation, it is noted that the text input shown in FIG. 3 describes text input according to input of "Tap and Tap-Drag".

Referring to FIG. 3, the portable device 100 of an exemplary embodiment of the present invention may include a text display area 145 and a text input area 146 according to activation of the text creation program 151. Moreover, the text input area 146 may include a first key icon selecting a consonant, a vowel, a double consonant, and a space; a second key icon selecting English conversion and numeral conversion; and a third key icon corresponding to a back space and an enter key. Here, as described earlier, there are a total of 14 consonants including "ㄱ, ㄴ, ㄷ, ㄹ, ㅁ, ㅂ, ㅅ, ㅇ, ㅈ, ㅊ, ㅋ, ㅌ, ㅍ, ㅎ". The vowels may have three texts, that is, 천지인 "ㆍ, ㅡ, ㅣ".

The portable device 100 outputting the text input area 146 allows a user to generate a touch event by selecting a "ㅣ" key icon among vowels and a touch down event by selecting "ㅇ". Accordingly, the control unit 160 may control the display unit 141 to display a text capable of being inputted on a predefined area along a specific direction based on a selected position of a consonant in a state that the vowel "ㅣ" and the consonant "ㅇ" are simultaneously touched. That is, as shown, the control unit 160 may instruct that a user may input "아" at the time of an upward drag, "위" at the time of a downward drag, "에" upon a rightward drag, and "에" at the time of a leftward drag in a state that the user touches down a consonant "O". Here, spacing distances between expected input texts and the consonant "ㅇ" can be adjusted by a designer's intention or user setting.

Accordingly, when a user drags a specific consonant in a specific direction based on a corresponding consonant position in a touch-down state, the user may input a vowel according to a drag direction, for example, one of "ㅏ, ㅓ, ㅗ, ㅜ", and combine a vowel "ㅣ" selected by a further multi-touch with a previously selected vowel to input a specific text. To do this, the control unit 160 of the portable device 100 may perform a buffering procedure for a touch down event for selecting the vowel "ㅣ", a buffering procedure for a touch down event for selecting a specific consonant, for example, "ㅇ", and a buffering procedure of a drag event for a specific direction based on the specific consonant position. Further, the control unit 160 may combine respective buffered touch events with each other to support a specific text input according to a drag direction.

Meanwhile, in the foregoing exemplary embodiment, it has been described that the control unit 160 outputs an expected input text capable of being input based on a position of a consonant when a multi-touch event for selecting vowels and consonants occurs. However, the present invention is not limited thereto. That is, the output of the expected input text may be omitted according to designer's intention or user setting.

As previously described, a portable device 100 of an exemplary embodiment of the present invention may support rapid and convenient input of specific consonants based on multi-touch and complex texts based on a drag in a specific direction and specific vowels.

Figure 4:
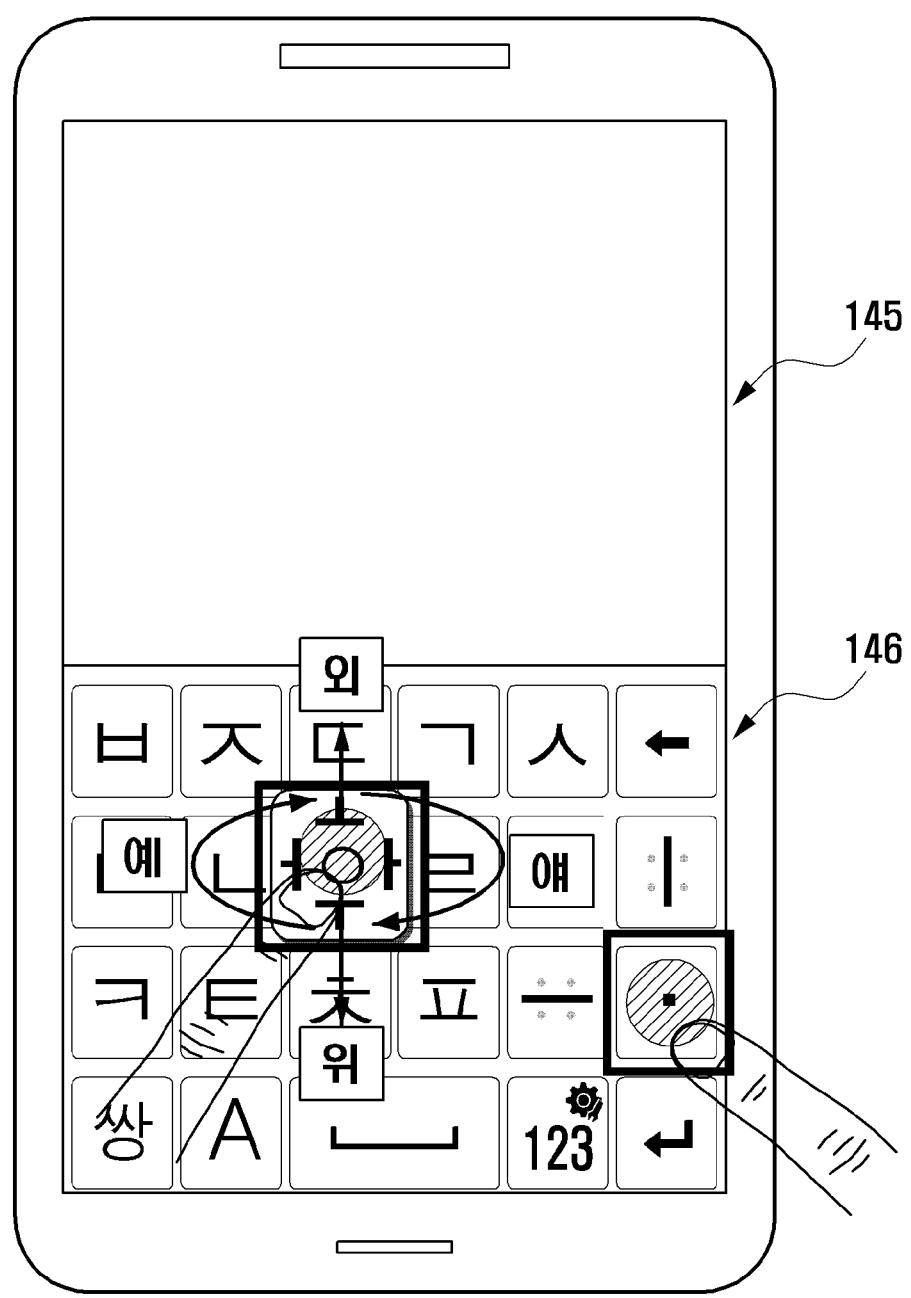
FIG. 4 is a view illustrating an example of a screen describing a text input procedure according to an exemplary embodiment of the present invention.

FIG. 4 is a view illustrating an example of a screen describing a text input procedure according to an exemplary embodiment of the present invention.

Referring to FIG. 4, the portable device 100 may output a text display area 145 and a text input area 146 as in FIG. 3. Accordingly, the user may input specific texts using key icons arranged on the text input area 146. In particular, the user may perform a touch down operation for selecting a vowel ""ㅣ"", and may simultaneously perform a touch down operation for selecting a specific consonant, for example, ""ㅇ"". Moreover, the user may perform a specific drag operation at a selected position of a consonant, for example, an operation executing a reciprocation drag based on a specific point. Accordingly, when a reciprocation drag in a leftward direction is performed, the control unit 160 of the portable device 100 may control buffering of a corresponding consonant and a double vowel, for example, ""ㅓ"" according to a leftward direction. In this case, the control unit 160 may combine a consonant ""ㅇ"" with a previously touched vowel ""ㅣ"" to input a text ""에"". In the same manner, when the user performs a reciprocation drag in a rightward direction, the portable device 100 may control input of a text ""에"". The timing of the text input may coincide with the time of occurrence of a touch cancellation event, or a time of occurrence of a drag event In the meantime, although a reciprocation drag in an upward or downward direction occurs, the control unit 160 of the portable device 100 may control input of only "아" and "아", as illustrated in FIG. 3. To do this, the portable device 100 may previously store a Data Base (DB) for texts to be created with specific consonants and vowels and check whether the texts to be created are included in the DB. Namely, when a text "요+ㅣ", which is created upon performing a reciprocation drag in the upward direction, exists in the DB, the user may determine the reciprocation drag as a general drag and control input of a text "의". Further, the portable device 100 may present a warning according to a user setting that texts to be created as a corresponding operation do not exist.

Figure 5:
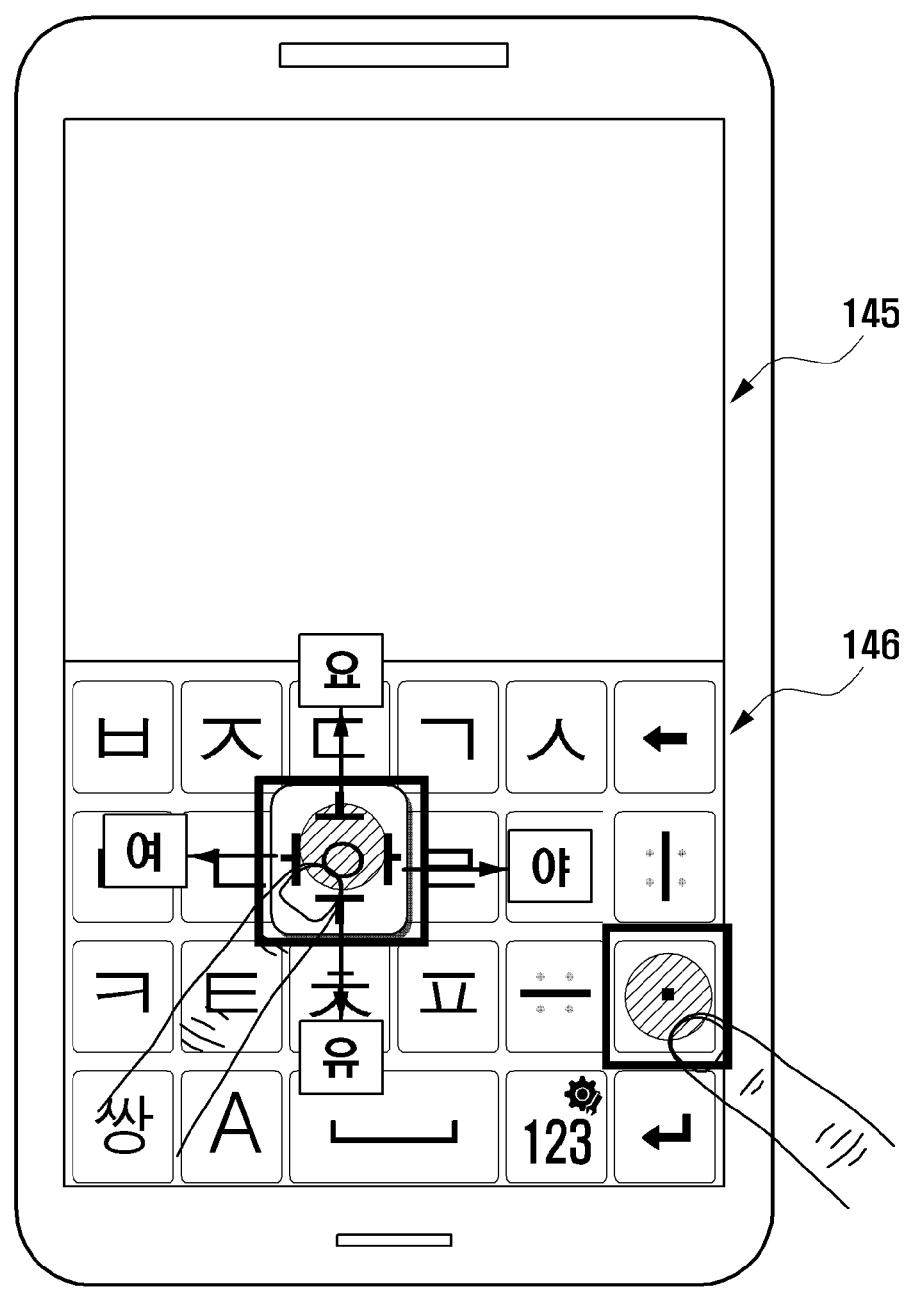
FIG. 5 is a view illustrating an example of a screen describing a text input procedure according to an exemplary embodiment of the present invention.

FIG. 5 is a view illustrating an example of a screen describing a text input procedure according to an exemplary embodiment of the present invention.

Referring to FIG. 5, the portable device 100 of an exemplary embodiment of the present invention may output a text display area 145 and a text input area 146 on a display unit 141. The text input area 146 is the same text input area as that 146 shown in FIG. 3 and FIG. 4.

The user may perform a touch down operation for selecting a vowel "ㆍ" as multi-touch in an output state of the text input area 146 and a touch down operation for selecting a consonant "ㅇ". Further, the user may continuously perform a drag operation in a predefined direction, for example, one of upward, downward, leftward or rightward directions.

Accordingly, the control unit 160 of the portable device 100 may buffer a touch down event for a vowel"ㆍ" created according to a multi-touch operation, a touch down event for a consonant "ㅇ", and a drag event in a specific direction continuously created at an occurrence position of the consonant "ㅇ". Moreover, the control unit 160 may control input of a specific text according to the drag event direction. For example, the control unit 160 may control the input of "아" at the occurrence time of a drag event in a leftward direction, "아" at the occurrence time of a drag event in a rightward direction, "요" at the occurrence time of a drag event in an upward direction, and "유" at the occurrence time of a drag event in a downward direction. Namely, when a consonant is selected and a drag event occurs in a specific direction in a selected state of a vowel "ㆍ", the control unit 160 may support addition of strokes of a vowel to the occurred drag event.

Figure 6:
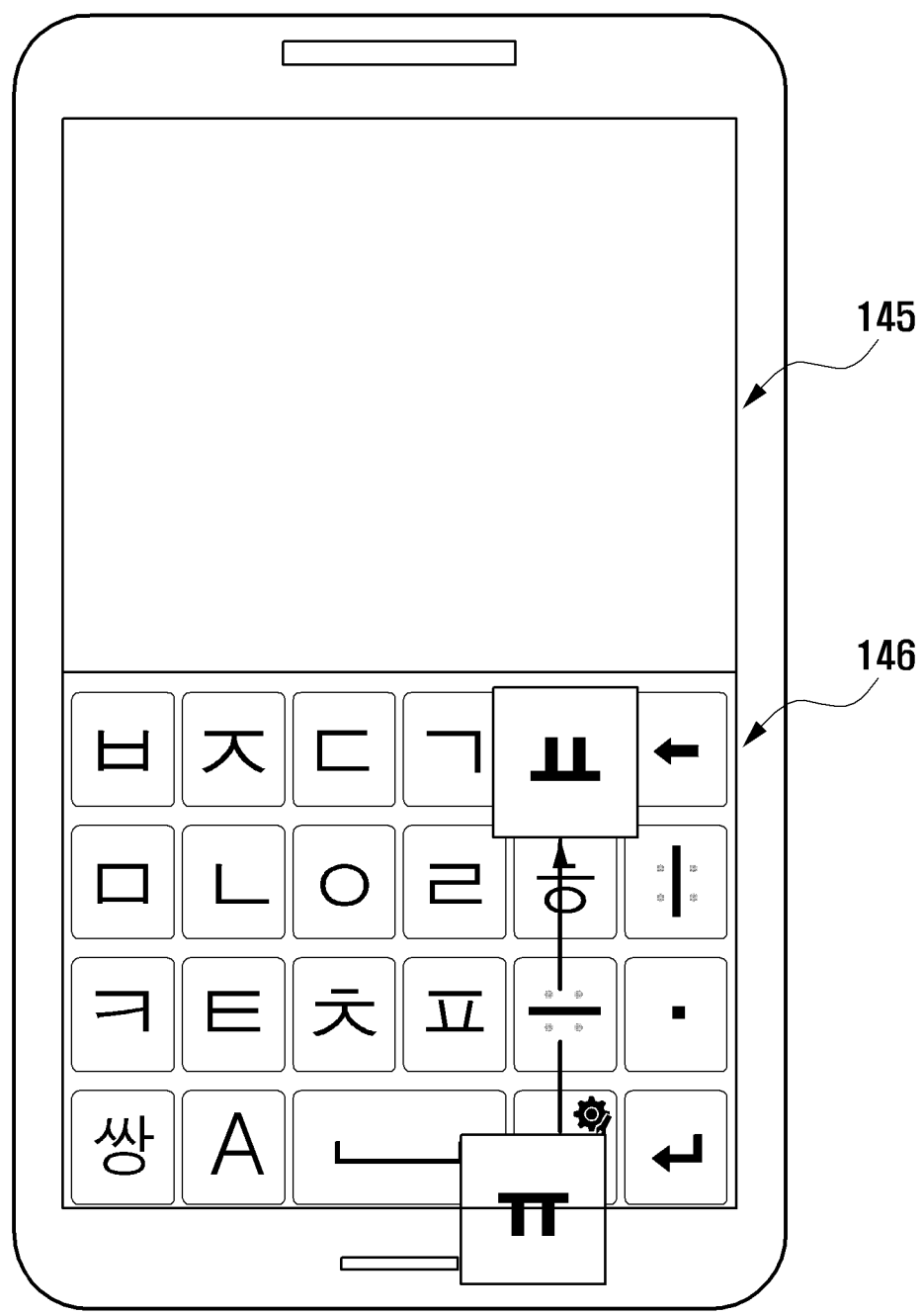
FIG. 6 is a view illustrating an example of a screen describing a text input procedure according to an exemplary embodiment of the present invention.

FIG. 6 is a view illustrating an example of a screen describing a text input procedure according to an exemplary embodiment of the present invention.

Referring to FIG. 6, the portable device 100 may output a text input area 146 and a text display area 145 on a display unit 141 as illustrated above. In this state, the user may create a touch down event for selecting a vowel "—" from the display input area 146 and a touch down event for a text "쌍" provided at a lower left side thereof. Further, the user may perform a drag operation in a predefined direction, for example, an upward or a downward direction to create a drag event in a state that a touch down event for selecting the vowel "—" maintains. Accordingly, the control unit 160 of the portable device 100 combines a touch down event for selecting the vowel "—", a drag event occurring in a predefined direction at a positioned point of a selected vowel, and a touch down event for selecting a text "쌍" to output a specific text, for example, "ㅗ" or "ㅜ" on the text display area 145. Namely, when a user selects a text "쌍" and a drag event in an upward direction occurs in a position of the vowel "—" in a state a vowel "—" is selected, the control unit 160 controls input of a vowel "ㅗ". In this case, when a drag event in a downward direction occurs, the control unit may control input of a vowel "ㅜ". At this time, when the user cancels multi-touch, the control unit 160 may input the foregoing texts.

In the meantime, in the foregoing exemplary embodiment, it has been explained that the user inputs a corresponding text upon generation of a drag event at a position of a vowel "—" in a state that a text "쌍" and a vowel "—" are simultaneously pushed. However, the present invention is not limited thereto. Namely, the user may generate a touch down event for selecting only a vowel "—" and continuously generate a drag event in an upward or downward direction. Accordingly, the control unit 160 may control input of the foregoing vowel "ㅗ" or "ㅜ" at the time of cancelling the drag event. Here, the control unit 160 may control not to perform a separate text input despite a drag event occurring in a leftward or rightward direction in a selected state of the vowel "—". That is, because strokes of a vowel are added according to a direction of a drag event to input a specific text, the control unit 160 may not recognize a text input through the addition of a vowel to a left or right side of a corresponding vowel and accordingly may disregard it. To do this, as described earlier, it is preferred to configure a DB for specific texts. The control unit 160 may determine the validity of texts to be generated according to a text input scheme by referring the DB.

Figure 7:
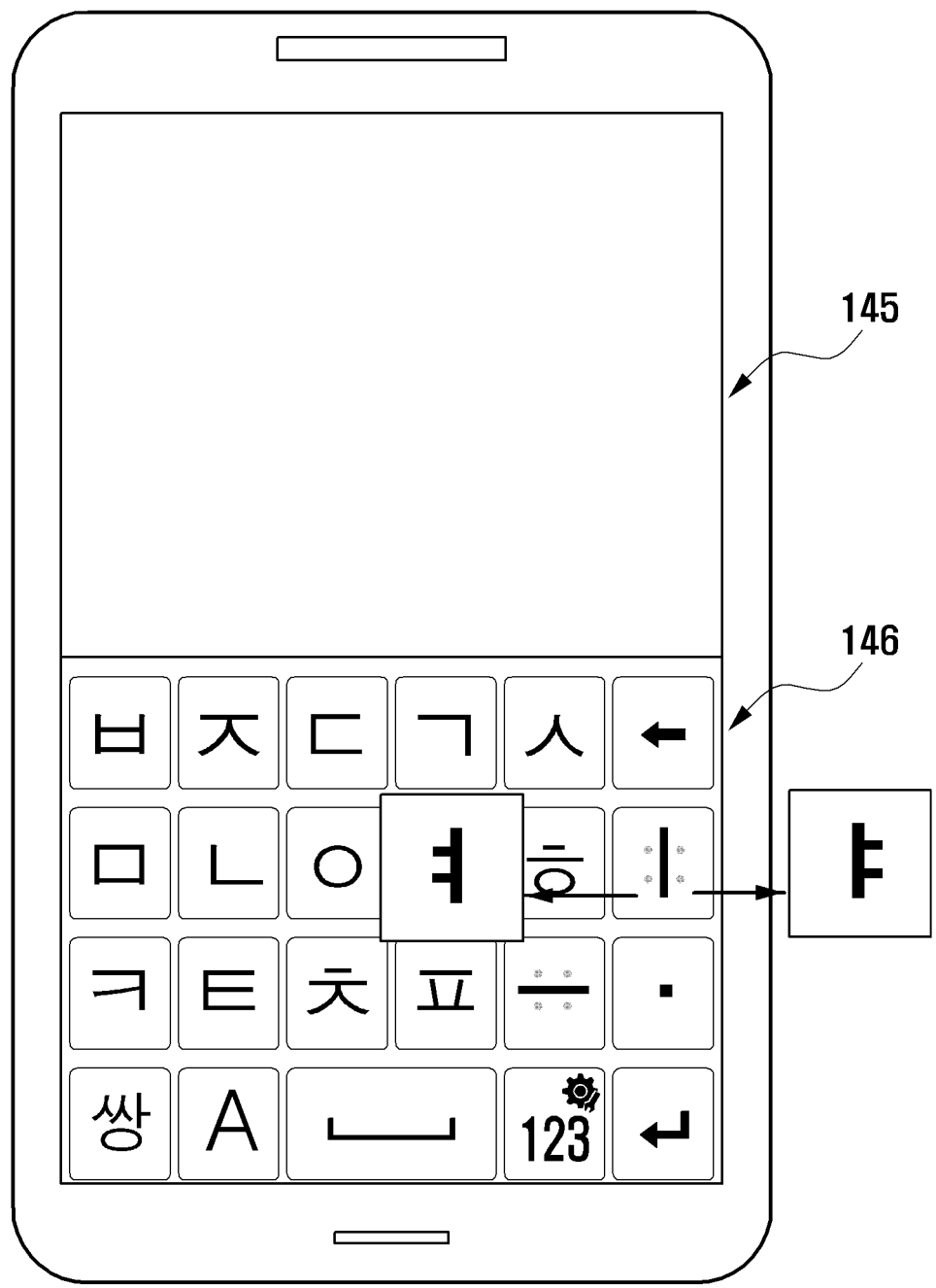
FIG. 7 is a view illustrating an example of a screen describing a text input procedure according to an exemplary embodiment of the present invention.

FIG. 7 is a view illustrating an example of a screen describing a text input procedure according to an exemplary embodiment of the present invention.

Referring to FIG. 7, as shown, the portable device 100 of an exemplary embodiment of the present invention may output a text display area 145 and a text input area 146 according to a request for activation of a text creation program 151 from a user. Accordingly, the user may generate a touch down event for selecting a vowel "ㅣ" from the text input area 146 and a touch down event for selecting a text "쌍" provided at a lower left side. Further, the user may perform a drag operation in a predefined direction, for example, a leftward or rightward direction in a state that a touch down event for selecting the vowel "ㅣ" maintains to generate a drag event. Accordingly, the control unit 160 of the portable device 100 may combine a touch down event selecting the vowel "ㅣ", a drag event generated in a predefined direction in a positioned point of a selected vowel, and a touch down event selecting the text "쌍" to control output a specific text, for example, "ㅓ" or "ㅏ" on the text display area 145. That is, when a drag event occurs in a leftward direction from a positioned point of the vowel "ㅣ" in a state that the text "쌍" and a vowel "ㅣ" are selected, the control unit 160 may control input of a vowel "ㅓ". In this case, when a drag event occurs in a rightward direction, the control unit 160 may control input of a vowel "ㅏ". At this time, when the user cancels multi-touch, the control unit 160 may input the foregoing texts. Here, the control unit 160 may perform a drag operation to a left or right side in a state that a user does not generate a touch down event for a text "쌍" but performs a touch down for selecting only a vowel "ㅣ". Accordingly, when a leftward drag event and a touch cancellation event are detected based on a selected point of the vowel "ㅣ", the control unit 160 of the portable device 100 may input and output a vowel "ㅓ" on the text display area 145. Further, when a rightward drag event and a touch cancellation event are detected based on a selected point of the vowel "ㅣ", the control unit 160 of the portable device 100 may input and output a vowel "ㅏ" on the text display area 145. In the meantime, in the foregoing exemplary embodiment, it has been explained that an output time of the specific text on the text display area 145 is a touch cancellation time. However, the present invention is not limited thereto. That is, the control unit 160 may perform a touch down operation for selecting a specific consonant or vowel, and then perform corresponding text input when a drag length of a drag event is larger than a predefined length.

Figure 8:
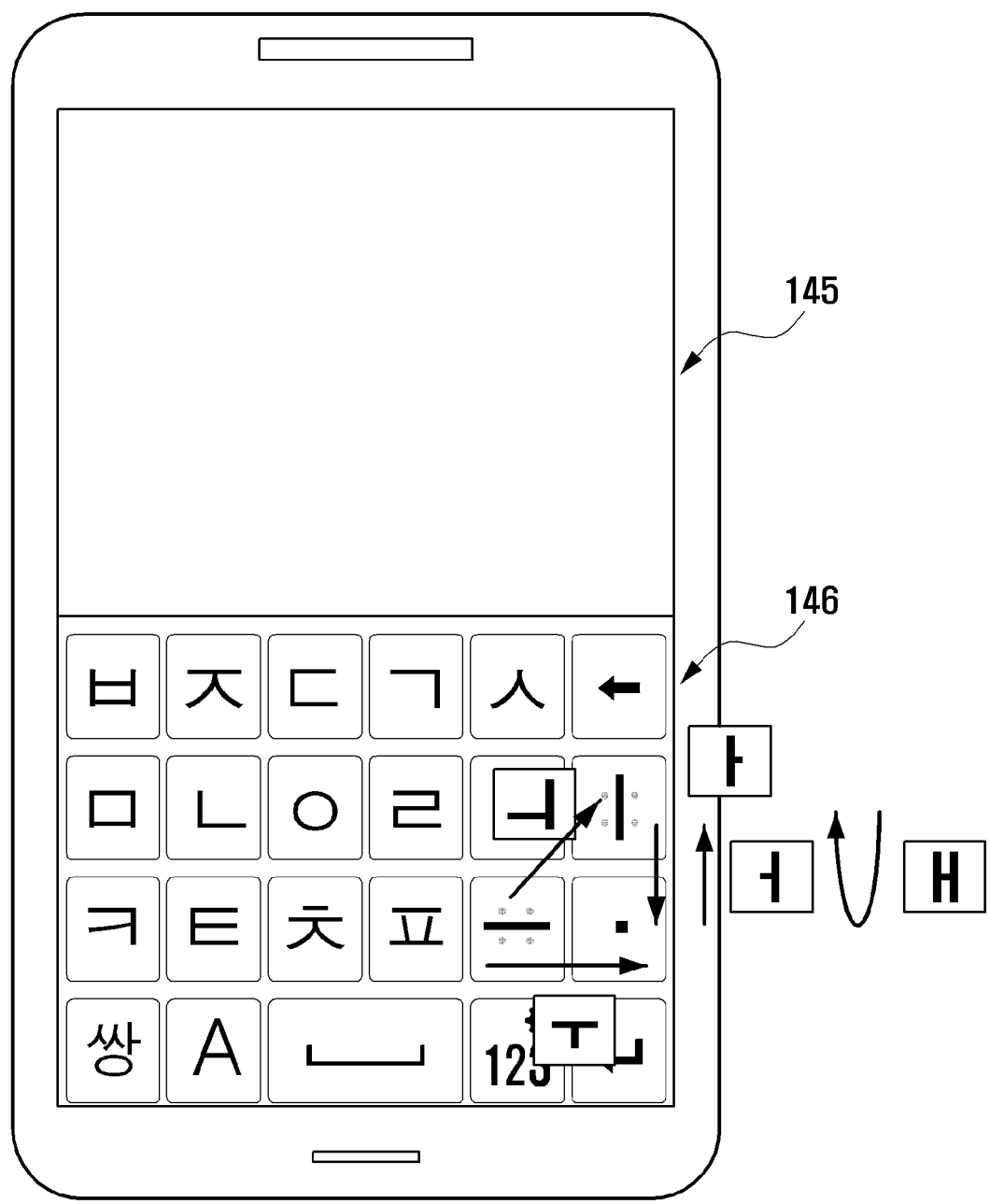
FIG. 8 is a view illustrating an example of a screen describing a text input procedure according to an exemplary embodiment of the present invention.

FIG. 8 is a view illustrating an example of a screen describing a text input procedure according to an exemplary embodiment of the present invention.

Referring to FIG. 8, a portable device 100 may output a text display area 145 and a text input area 146, respectively. In this case, a user may select vowels positioned at a right center at a time to rapidly perform specific text input. For example, when the user performs a touch down operation for selecting a vowel "—" and then performs a drag operation for selecting a vowel "ㅣ" located in a rightward diagonal direction, the control unit 160 may control input of a double vowel "ㅢ". Meanwhile, when a drag event for selecting a vowel "•" continuously occurs after generation of a touch down event for selecting a vowel "ㅣ", the control unit 160 may control input of a vowel "ㅏ". Moreover, when a drag event for selecting a vowel "ㅣ" occurs after selection of a vowel "•", the control unit 160 may control input of a vowel "ㅓ". When a drag event for selecting a vowel "ㅣ" occurs again after a touch down event for selecting a vowel "ㅣ" occurs and a drag event for selecting"•", then the control unit 160 may control output of a vowel "ㅐ" on a text display area 145. When a drag event for selecting a vowel "ㅐ" occurs after generation of a touch down event for selecting a vowel "—", the control unit 160 may control input of a vowel "ㅜ". Conversely, when an input signal for selecting the vowel "—" occurs after generation of a touch down event for selecting "•", the control unit 160 may control input of a vowel "ㅗ".

In the meantime, when a drag event in a specific direction occurs after generation of a touch down event as mentioned above in a selected state of a consonant, the control unit 160 may input a combined text of corresponding consonants and the foregoing vowels to output the combined text on the text display area 145. For example, when the user selects a specific vowel, for example, "ㅓ" in a vowel selection scheme as described above in a touched state of a consonant "ㅇ", the control unit 160 may control input of a text "어". In the same manner, when the user performs a touch operation for selecting a specific vowel, for example, "ㅐ" in the foregoing vowel selection way in a selected state of the consonant "ㅌ", the control unit 160 may input and output a text "떄" on the text display area 145.

Figure 9:
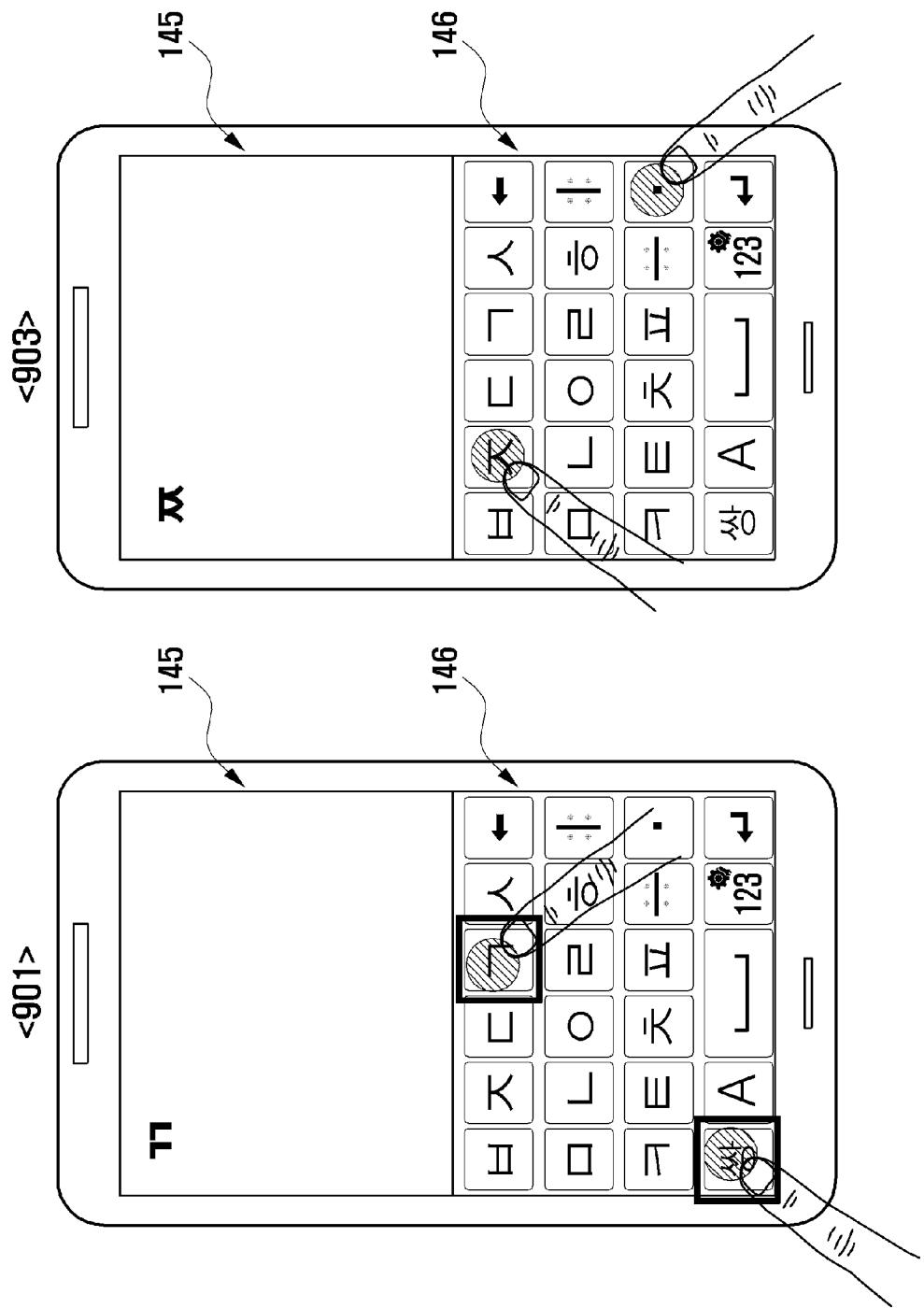
FIG. 9 is a view illustrating an example of a screen describing a text input procedure according to an exemplary embodiment of the present invention.

FIG. 9 is a view illustrating an example of a screen describing a text input procedure according to an exemplary embodiment of the present invention. FIG. 9 shows an example of text input by "Tap and Tap".

Referring to FIG. 9, a portable device 100 of an exemplary embodiment of the present invention supports input of double consonants based on a multi-touch scheme. To do this, the portable device may output a screen with a text display area 145 and a text input area 146 as shown in a screen 901 on a display unit 141 according to a request for activation of a text creation program from a user. The user may generate a touch down event for selecting a key icon corresponding to a text "쌍" and a touch down event for selecting a key icon corresponding to a specific consonant, for example, a text "ㄱ" in this state. Accordingly, the control unit 160 may buffer and store respective key icons according to the multi-touch, and combines buffered information, and inputs and outputs a double consonant "ㄲ" on the text display area 145.

Furthermore, the user may use a specific vowel as a key icon for creating a double consonant according to selection of a text input mode. To do this, the portable device 100 may provide a menu capable of selecting the text input mode. The text input mode may include a general vowel mode supporting use of the vowel as a general vowel and a double consonant conversion mode supporting conversion of a consonant into the double vowel. In a case, as shown in a screen 903, when the double consonant conversion mode is selected, when a user generates a touch down event for selecting a vowel "•" and a touch down event for selecting a specific consonant, for example, "ㅈ", , the control unit 160 may combine the selected vowel and consonant with each other to control input of a double consonant "ㅉ". Here, a type of the vowel can be changed according to a designer's intention.

Figure 10:
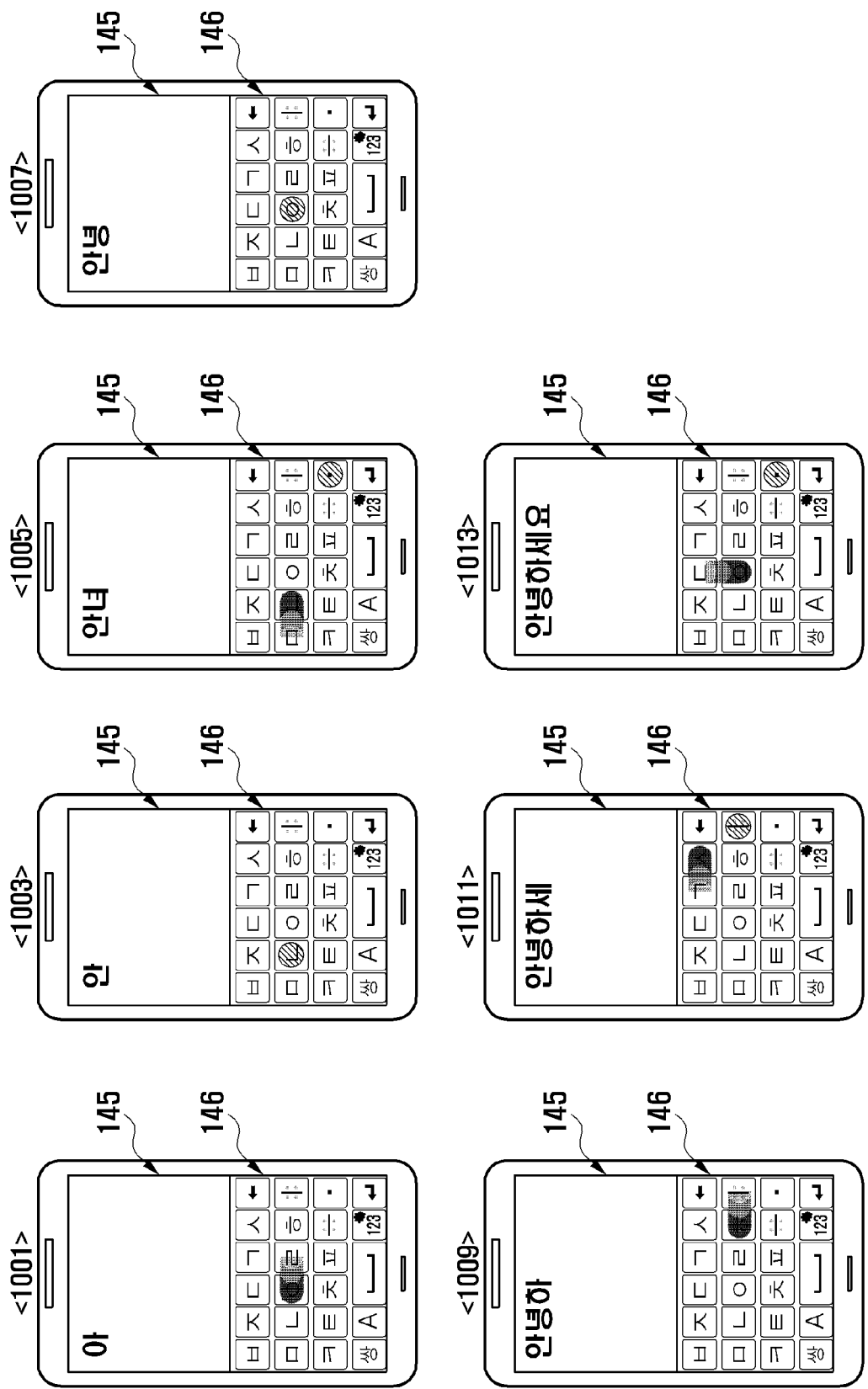
FIG. 10 is a view illustrating an example of a screen describing a text input procedure according to an exemplary embodiment of the present invention.

FIG. 10 is a view illustrating an example of a screen describing a text input procedure according to an exemplary embodiment of the present invention.

Referring to FIG. 10, a user may select a menu capable of activating a program for creating texts from menu items, or a hot key allocated for activating a text creation program 151. Accordingly, the portable terminal 100 may output a screen with a text input area 146 and a text display area 145 on a display unit. Next, a user may select key icons in a following order to input a sentence "안녕하세요". First, a user may perform a touch down operation for selecting a consonant "ㅇ" as shown in a screen 1001 and then performs a drag operation in a leftward direction. Accordingly, the control unit 160 may buffer a touch down event for selecting a consonant "ㅇ", and combine continuously input leftward direction drag events to input and output a text "아" on the text display area 145.

Next, the user may perform a touch down operation for selecting a consonant "ㄴ" as a final consonant. Accordingly, the controller 160 may combine the input consonant "ㄴ" with a previously input vowel "아" to complete and output a text "안" on the text display area 145 as shown in a screen 1003.

Further, the user may generate a touch down event selecting a vowel "•", select a consonant "ㄴ", and generate a drag event in a leftward direction based on a selected point of the consonant "ㄴ" as shown in a screen 1005. Accordingly, the control unit 160 may combine the vowel "•", the consonant "ㄴ", and a leftward direction drag event to input a text "녀". Consequently, "안녀" may be output on the text display area 145. Subsequently, when a touch event corresponding to "ㅇ" selected as a final consonant of the "녀" occurs as shown in a screen 1007, the control unit 160 may combine a currently input consonant "ㅇ" with a previously input "녀" to input of a text "녕". As a result, "안녕" may be output on the text display area 145. Next, the user may perform a touch down operation for selecting a consonant "ㅎ" and a drag operation in a leftward direction at a positioned point of a selected consonant "ㅎ" as shown in a screen 1009 to input a text "하". Accordingly, the control unit 160 may combine input touch events to perform input of the text "하".

Furthermore, the user may perform a touch down operation for selecting a vowel "ㅣ", a touch down operation for selecting a consonant "ㅅ", and a drag operation in a leftward direction at a touched point of the consonant "ㅅ" as shown in a screen 1011 to input a text "세". Accordingly, the control unit 160 may control a combination of input touch events to input a text "세". In this case, when two multi-touches are input regardless of an order of an input time of the vowel "ㅣ", an input time of a consonant "ㅅ", and an input time in a leftward direction drag event, the control unit 160 may control input of a text "세".

Finally, a user may perform a touch down operation for selecting a vowel"•", a touch down operation for selecting a consonant "ㅇ", and a drag operation in an upward direction at a selected point of the consonant "ㅇ" as shown in a screen 1013 to input a text "요". Consequently, the control unit 160 may control the combination of a touch event for selecting the consonant "ㅇ", a drag event in an upward direction, and a touch event for selecting a vowel"•" to input the text "요".

As described above, the text input method of a portable device according to an exemplary embodiment of the present invention includes a multi-touch of a specific consonant and a specific vowel, and generates a drag event in a specific direction at a selected position of the specific consonant or the specific vowel to combine generated touch events such that input of complicated text may be easily processed.

Figure 11:
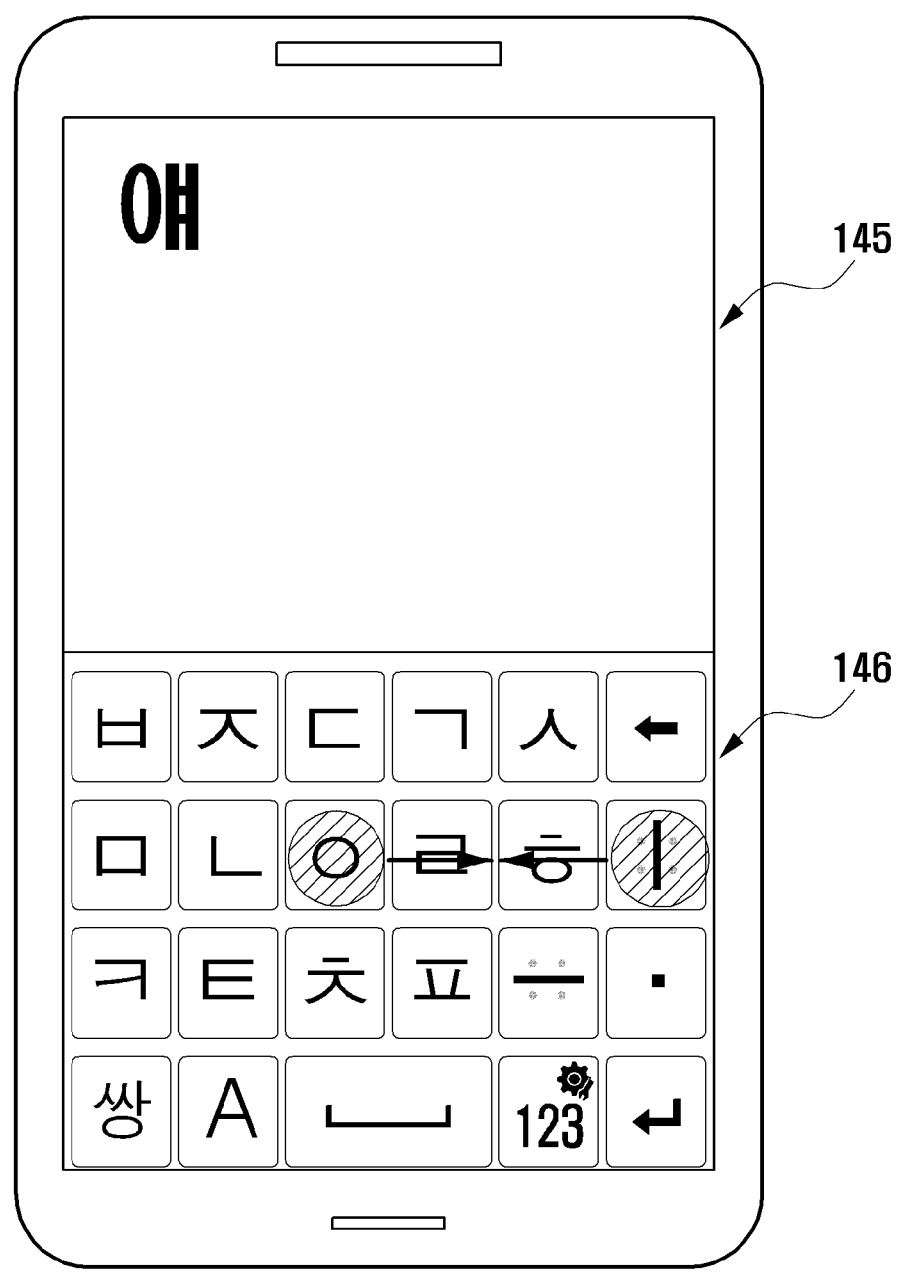
FIG. 11 is a view illustrating an example of a screen describing a text input procedure according to an exemplary embodiment of the present invention.

FIG. 11 is a view illustrating an example of a screen describing a text input procedure according to an exemplary embodiment of the present invention. FIG. 11 illustrates text input based on "Tap-Drag and Tap-Drag".

Referring to FIG. 11, a user may create a specific double vowel by a combination of key icons multi-touching a touch-down and a drag operation. For example, to input a text "애", the user may perform a touch down operation for selecting a consonant "ㅇ" and a touch down operation for selecting a vowel "ㅣ". Further, the user may perform a drag operation in a rightward direction in a selected position of the consonant "ㅇ" and a drag operation in a leftward direction in a selected position of the vowel "ㅣ". Accordingly, the control unit 160 of the portable device 100 may consider a text "아" by a combination of a touch down event selecting the vowel "ㅇ" and a rightward drag event created by a continuous operation. Further, the control unit 160 of the portable device 100 may consider a text "ㅓ" by a combination of a touch down event selecting the vowel "ㅣ" and a leftward drag event generated by a continuous operation. As a result, the control unit 160 may combine the text "아" and the text "ㅓ" to input a text "애". In this case, the control unit 160 may previously display the "애" being a complete text of the " 아" or and the "ㅓ" at one side of a screen prior to input, and terminate corresponding text input at the time of generating a touch cancellation event.

In summary, the text input method of a portable terminal according to an exemplary embodiment of the present invention may support input of a specific text, for example, a double consonant according to a multi-touch event in which a plural key icons are selected on a key map in an active state of a specific text input mode.

That is, the control unit 160 of an exemplary embodiment of the present invention may support specific text input according to "Tap and Tap" type multi-touch. Furthermore, an exemplary embodiment of the present invention allows for the simplified input of complicated texts according to a "Tap-Drag and Tap" or "Tap and Tap-Drag" type multi-touch. In addition, an exemplary embodiment of the present invention allows for the simplified input of complicated double vowels using "Tap-Drag and Tap-Drag" schemes. Here, a left side and a right side may refer to a touch input based on the "and", respectively.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A text input method for a portable device, the method comprising:
   displaying a screen including a text input area with at least one consonant and vowel;
   detecting one or more multi-touch events obtained by multi-touching at least two key icons included in the text input area, wherein a multi-touch event of the one or more multi-touch events comprises touching one of the at least two key icons while maintaining a touch to another of the at least two key icons; and
   combining key icons selected based on the multi-touch events to display at least one specific text,
   wherein the displayed at least one specific text is not input while the one or more multi-touch events are maintained, and
   wherein each of the at least two key icons is selected from a predetermined set of key icons comprising at least one vowel key icon, at least one consonant key icon, and at least one key icon for inputting a double consonant.

2. The method of claim 1, further comprising detecting drag events occurring when at least one of multi-touches of the at least two key icons moves in a predefined direction in a state where the multi-touches are maintained.

3. The method of claim 2, wherein the detecting of the drag events comprises at least one of:
   detecting drag events occurring at a positioned point of the consonant from the text input area;
   detecting drag events occurring at a positioned point of the vowel from the text input area; and
   detecting reciprocation drag events dragged and reciprocated to a positioned point of at least one of the consonant and the vowel after a drag occurs in a predefined direction in a positioned point of at least one of the consonant and the vowel.

4. The method of claim 3, wherein the displaying of the specific text includes displaying a text created by adding strokes of a vowel to a vowel "ㅣ" according to a direction of the drag event upon detecting the drag events occurring at a positioned point of the consonant, and a text composed of a combination of a consonant and a vowel selected at the time of multi-touches.

5. The method of claim 3, wherein the displaying of the specific text includes displaying a text obtained by adding strokes of a vowel to the selected vowel according to a direction of the drag event upon detecting the drag events occurring at a positioned point of the consonant, and a text combining a consonant selected at the time of multi-touches.

6. The method of claim 3, wherein the displaying of the specific text comprises:
   adding strokes of a vowel to a vowel "ㅣ" according to a direction of a drag event generated based on the selected consonant;
   adding strokes to a corresponding vowel according to a direction of a drag event generated based on the selected vowel; and
   displaying a text composed of a combination of the vowel having added strokes, the consonant, and strokes added to the vowel "ㅣ".

7. The method of claim 3, wherein the displaying of the specific text includes combining and displaying a vowel "ㅣ" at the time of generating the reciprocation drag event, a double vowel including addition of strokes in a direction of the reciprocation drag event and the vowel "ㅣ", and a text including a consonant and a vowel selected at the time of the multi-touches.

8. The method of claim 1, further comprising activating a double consonant generation mode,
   wherein the displaying of the specific text includes displaying a selected consonant as a double consonant when the consonant and a vowel are selected according to the multi-touch event at the time of activating the double consonant generation mode.

9. The method of claim 1, further comprising disregarding a display of a corresponding text when a text to be displayed prior to displaying the text is not included in a stored text data base list.

10. The method of claim 1, wherein the displaying of the text input area comprises:
    displaying a vowel area including "ㅡ", "ㅣ", and "•";
    displaying a consonant area including ㄱ, ㄴ, ㄷ, ㄹ, ㅁ, ㅂ, ㅅ, ㅇ, ㅈ, ㅊ, ㅋ, ㅌ, ㅍ, and ㅎ; and
    displaying a "쌍" key icon for inputting a double consonant.

11. The method of claim 1, further comprising inputting the combined specific text when a touch cancellation event occurs.

12. The method of claim 1, further comprising displaying currently touched key values and at least one complete text capable of being complete according to a drag direction when the multi-touch is dragged in a specific direction in a maintained state prior to input completion.

13. The method of claim 12, further comprising inputting the displayed text in a corresponding drag direction among the at least one displayed complete text when a touch cancellation event occurs after generation of an event to the drag direction.

14. A portable device comprising:
    a touch screen including a display unit for displaying a text input area and a text display area including at least one consonant and vowel, and a touch panel provided at an upper side of the display unit for generating a touch event; and
    a control unit for controlling text displayed according to a touch event generated from the touch screen,
    wherein the control unit detects one or more multi-touch events for at least two key icons output on the text input area, and controls the display of at least one specific text composed of a combination of the multi-touched key icons based on the detected multi-touch events, wherein a multi-touch event of the one or more multi-touch events comprises touching one of the at least two key icons while maintaining a touch to another of the at least two key icons, wherein each of the at least two key icons is selected from a predetermined set of key icons comprising at least one vowel key icon, at least one consonant key icon, and at least one key icon for inputting a double consonant, and wherein the displayed at least one specific text is not input while the one or more multi-touch events are maintained.

15. The portable device of claim 14, further comprising a buffer for temporarily storing the multi-touch event and a drag event of at least one of the touches of the at least two key icons occurring in a state where the multi-touch is maintained.

16. The portable device of claim 15, wherein the buffer further stores at least one of:
- a drag event occurring in a predefined direction at a positioned point of a consonant among the key icons in the state where the multi-touch is maintained;
- a drag event occurring in a predefined direction at a positioned point of a vowel among the key icons in the state where the multi-touch maintained;
- two drag events occurring in a predefined direction at positioned points of the consonant and the vowel among the key icons in the state where the multi-touch is maintained; and
- a reciprocation drag event reciprocated to an initial position after a drag occurs in a predefined direction at a positioned area of at least one of the selected key icons in the state where the multi-touch is maintained.

17. The portable device of claim 16, wherein the control unit controls the display of a text obtained by adding strokes of a vowel according to the drag event direction to a vowel "ㅣ", and a text composed of a combination of a consonant and a vowel selected at the time of the multi-touch when a drag event occurs in the positioned point of the consonant;
controls the display of a text obtained by adding strokes in the drag event direction to the selected vowel and a text composed of a combination of selected consonants at the time of multi-touch when detecting drag events occurring in a predefined direction at a positioned area of a vowel in a touch state in a state where the multi-touch is maintained;
controls the display of a text including a vowel with added strokes, the consonant and strokes added to a vowel "ㅣ" after strokes of a vowel is added to the vowel "ㅣ" according to a drag event direction occurring based on the selected consonant, and strokes are added to a corresponding vowel according to a drag event occurring based on the selected vowel when detecting drag event occurring in a predefined direction in a positioned area of a consonant in the touch state in the state where the multi-touch is maintained; and
controls the display of a combination of a vowel "ㅣ", a double vowel including strokes in the reciprocation drag event direction and vowel "ㅣ", and a text including a consonant and a vowel selected at the time of multi-touches when detecting the reciprocation drag event.

18. The portable device of claim 14, wherein the control unit controls the input of a double consonant of the selected consonant according to selection of a text input mode.

19. The portable device of claim 17, further comprising a storage unit for storing texts capable of being generated as a vowel and a consonant included in the text input area as a database,
wherein the control unit disregards a corresponding text input when a text to be input prior to the text input is not included in a list of the database of the storage unit.

20. The portable device of claim 14, wherein the control unit controls the display of currently touched key values and at least one complete text capable of being complete according to a drag direction when the multi-touch is dragged in a specific direction in a maintained state prior to input completion, and controls input of the displayed text in a corresponding drag direction among the at least one displayed complete text when a touch cancellation event occurs after generation of an event in the drag direction.

* * * * *